United States Patent

[11] 3,581,874

| [72] | Inventor | Milroy A. Keith<br>5505 W. Colorado Place, Denver, Colo.<br>80226 |
|---|---|---|
| [21] | Appl. No. | 836,194 |
| [22] | Filed | May 26, 1969 |
| [45] | Patented | June 1, 1971 |

[54] PORTABLE STACKING DEVICES FOR CONVEYORS
4 Claims, 4 Drawing Figs.

| [52] | U.S. Cl. | 198/121,<br>198/124, 198/233 |
|---|---|---|
| [51] | Int. Cl. | B65g 21/00 |
| [50] | Field of Search | 198/97,<br>117, 124, 125, 100, 233, 118, 95, 115 |

[56] References Cited
UNITED STATES PATENTS

| 1,261,179 | 4/1918 | Stuart | 198/97 |
|---|---|---|---|
| 1,347,493 | 7/1920 | Bullock et al. | 198/233 |
| 1,762,885 | 6/1930 | Oppenheim et al. | 198/117 |
| 2,762,490 | 7/1950 | Kling | 198/97 |
| 3,343,651 | 8/1966 | Oury et al. | 198/118 |

*Primary Examiner*—Evon C. Blunk
*Assistant Examiner*—H. S. Lane
*Attorney*—R. H. Galbreath

ABSTRACT: A portable, relatively short, self-powered, reversible, belt conveyor arranged for attachment to a main conveyor to receive articles from or convey articles to the main conveyor. Said self-powered conveyor being pivotally mounted so as to be horizontally and vertically adjustable to conveniently stack the received articles for storage.

INVENTOR.
MILROY A. KEITH
BY

PORTABLE STACKING DEVICES FOR CONVEYORS

There are many types of portable conveyors for conveying articles such as mail bags, bales, barrels, drums, boxes and cartons to desired locations such as to and from highway trucks or railroad cars or into warehouses for storage. Usually the articles being delivered by the conveyor are stacked by hand to fully utilize the storage space available. Attempts have been made to provide specialized conveyors with means for delivering the articles at desired locations and at desired elevations. This greatly increases the cost, size and complexity of the conveyors and renders them inconvenient for straight conveying arrangements.

The principle object of this invention is to provide a simple, reversible, self-powered, easily portable stacking device which can be quickly placed in receiving position relative to any conventional conveyor without any interference with the operation of the latter and which will receive and stack the articles delivered by the conveyor at any desired horizontal or vertical location to eliminate or reduce labor requirements and which can be quickly and easily interchanged between various conveyors to accommodate any desired conveyor arrangement.

Other objects and advantages reside in the detail construction of the invention, which is designed for simplicity, economy, and efficiency. These will become more apparent from the following description.

In the following detailed description of the invention, reference is made to the accompanying drawings which forms a part hereof. Like numerals refer to like parts in all views of the drawings and throughout the description.

Figure 1:
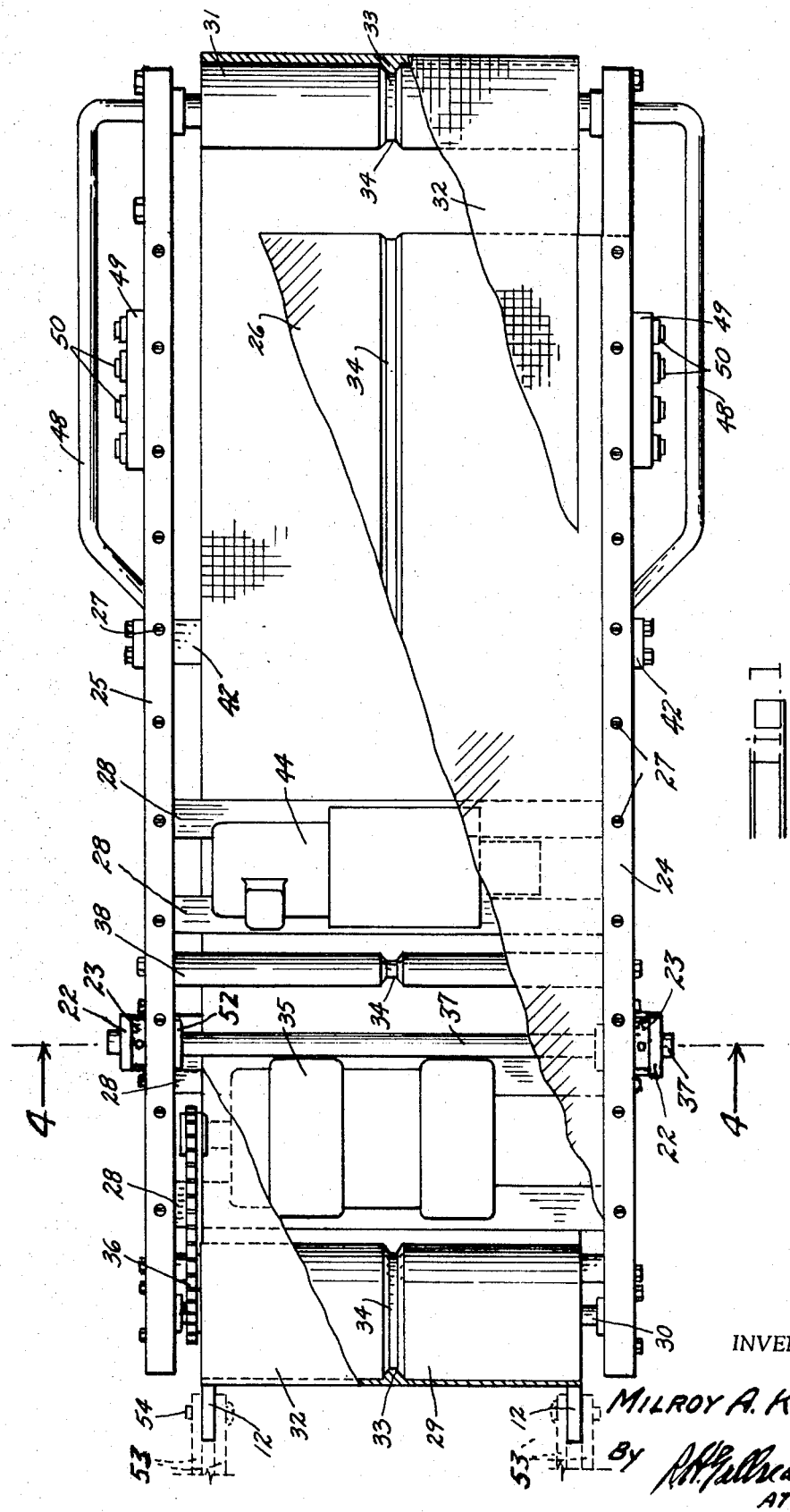
FIG. 1 is a top plan view of the stacking device of this invention partially broken away to expose interior structure.
Figure 4:
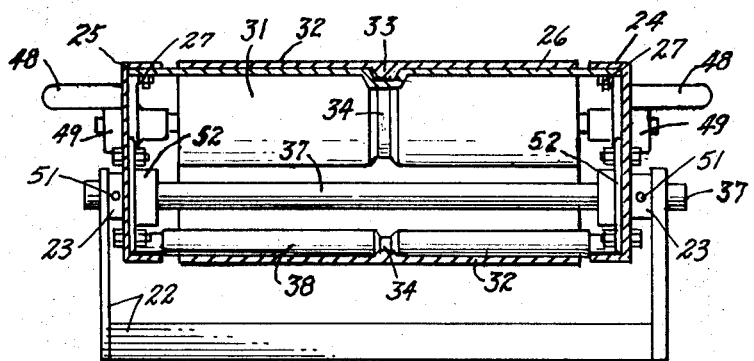

FIG. 4 is a detail vertical section view, taken on the line 4-4, FIG. 1, showing a vertical yoke shaft 19 and yoke 22, to be later described, in elevation and with a later-described hydraulic pump unit 44 omitted for the sake of clarity.

Figure 2:
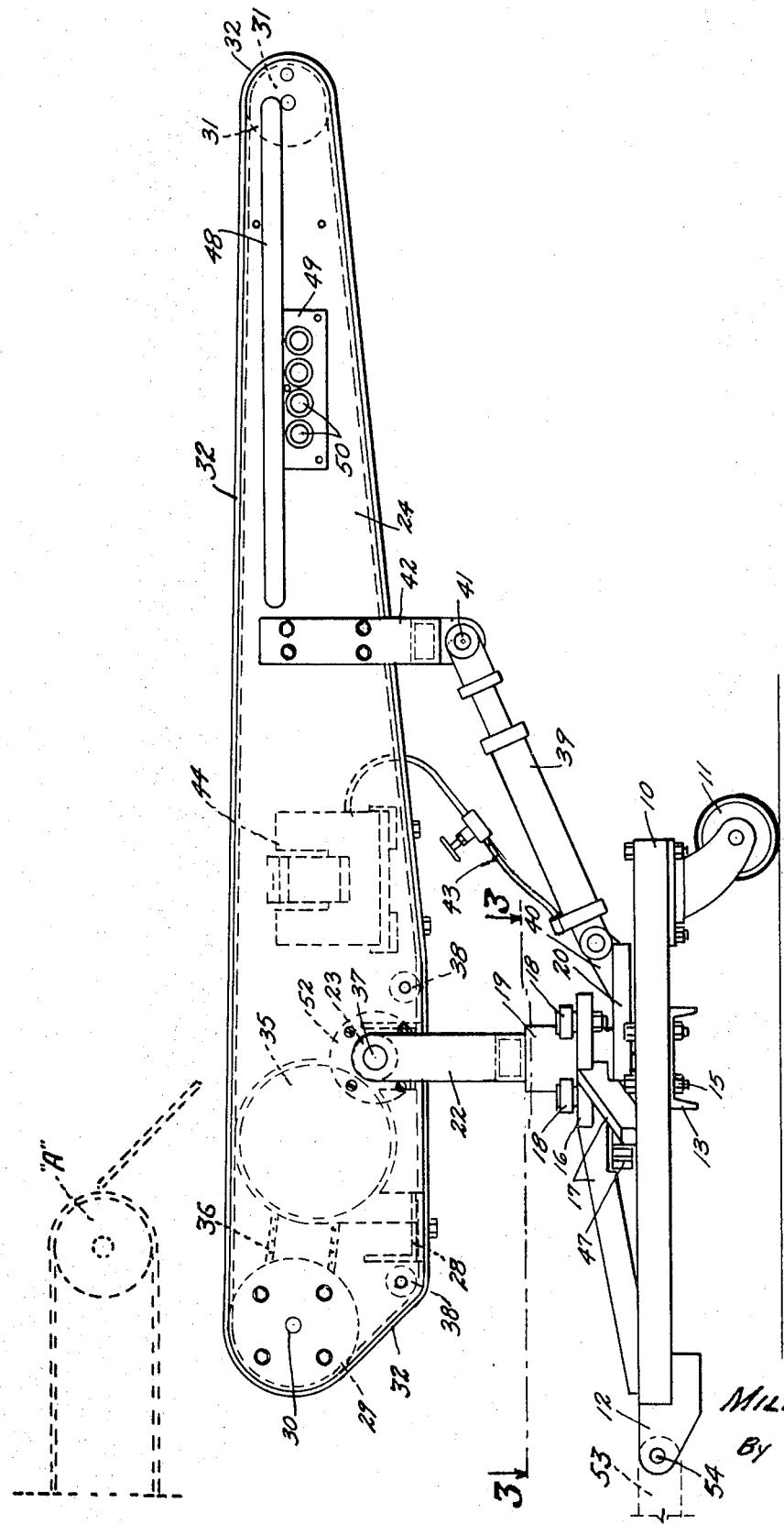
FIG. 2 is a side elevational view thereof.

In FIG. 2 the discharge extremity of a conventional conveyor is indicated in broken line at A to show its relation to the stacking device of this invention. The conventional conveyor is provided with stacker attachment lugs 53 to which the present stacking device may be attached.

Briefly, the form of the invention illustrated on the accompanying drawings comprises a portable base assembly provided with a vertical universal pivot assembly from which one extremity of an elongated, self-powered belt conveyor assembly is supported. The universal pivot assembly is so arranged that the conveyor assembly may be rotated both horizontally, to vary its direction of projection from the base assembly, and vertically to vary its incline from the base assembly.

The base assembly comprises an open rectangular base frame 10 supported at its forward extremity upon a swivel caster wheel 11 and provided at its rear extremity with suitable attachment brackets 12 which may be detachably secured, by means of pins 54 to the attachment lugs 53 of any conventional conveyor equipment to horizontally support the base frame 10 therebelow. A channel iron 13 is bolted below and extends transversally across the base frame 10 to support a base bearing 14 which is medially bolted thereto as indicated at 15. A horizontal, circular, brace ring 16 is rigidly positioned above and in vertical axial alignment with the axis of the base bearing 14 upon fixed brace members 17 extending radially to the base frame 10. The brace ring is provided with an annular series of rotatable "cam yoke" roller bearings 18 for the purpose below described.

The pivot assembly comprises the vertical yoke shaft 19 to the bottom of which a horizontal, circular, position-locking plate 20 is fixedly and concentrically attached by suitable attachment screws 56. A pivot stud 21 projects axially downward from the yoke shaft 19 and through the position-locking plate 20 into pivotal relation with the base bearing 14 of the base assembly. The U-shaped yoke 22 is fixedly and medially mounted on the upper extremity of the yoke shaft 19. The extremities of the U-shaped yoke 22 extend upwardly in spaced-apart relation to horizontally support a tilt shaft 37 upon which the conveyor assembly is tiltably mounted. The tilt shaft 37 is fixedly locked, by means of setscrews 51, welded to the upwardly extending sides of the yoke 22.

The conveyor assembly comprises two inwardly flanged conveyor sideplates 24 and 25, which are similar but of opposite hand, and which are maintained in parallel spaced relation by means of suitable cross braces 28 and by a rectangular belt-supporting plate 26, which extends between and is bolted, as indicated at 27, beneath the upper flanges of the sideplates. A belt drive roller 29, mounted on a drive shaft 30, and an idler belt roller 31 are journaled between the sideplates at the respective extremities of the assembly and a pair of tension rollers 38 are journaled between the sideplates intermediate the rollers 29 and 31. An endless conveyor belt 32 is trained over the belt rollers 29 and 31 and about the tension rollers 38. The belt is preferably of the type having a guide ridge 33 on its back side such as a "3 ply, 01503, Steep Grade V-Back" belt. The rollers 29, 31 and 38 and the belt-supporting plate 26 are each provided with guide grooves 34 to receive the guide ridge 33 and maintain the belt in accurate alignment. The belt drive roller 29 is driven from a reversible electric motor 35, mounted on certain of the cross braces 28, through a suitable transmission chain 36. Flanged bearings 52 are secured to the inner faces of the sideplates 24 and 25 to pivot the latter on the tilt shaft 37 adjacent the belt drive roller 29 to pivotally mount the conveyor assembly in the yoke 22. When assembled, the yoke shaft 19 extends axially vertically downward through the circular brace ring 16, in close circumferential contact with the roller bearings 18, with its pivot stud 21 rotatably mounted in the base bearing 14. The freely rotatable roller bearings 18 of the brace ring 16 allow free rotation of the yoke shaft 19 but prevent lateral tilting thereof relative to the base frame 10.

The free extremity of the conveyor assembly is adjustably supported by means of a hydraulic cylinder 39 pivotally mounted on a lug 40 on the position-locking plate 20 and extends upwardly and forwardly therefrom to a pivotal connection 41 on a U-shaped brace frame 42. The upturned extremities of the brace frame 42 are secured to the outer faces of the sideplates 24 and 25 of the conveyor assembly so as to support the pivotal connection 41 medially below the belt 32. Hydraulic pressure is supplied to and retreived from the hydraulic cylinder 39 through a flexible hydraulic hose 43 extending to a conventional motor-driven hydraulic pump unit 44 which is supported between the conveyor sideplates 24 and 25 on certain of the cross braces 28.

Figure 3:
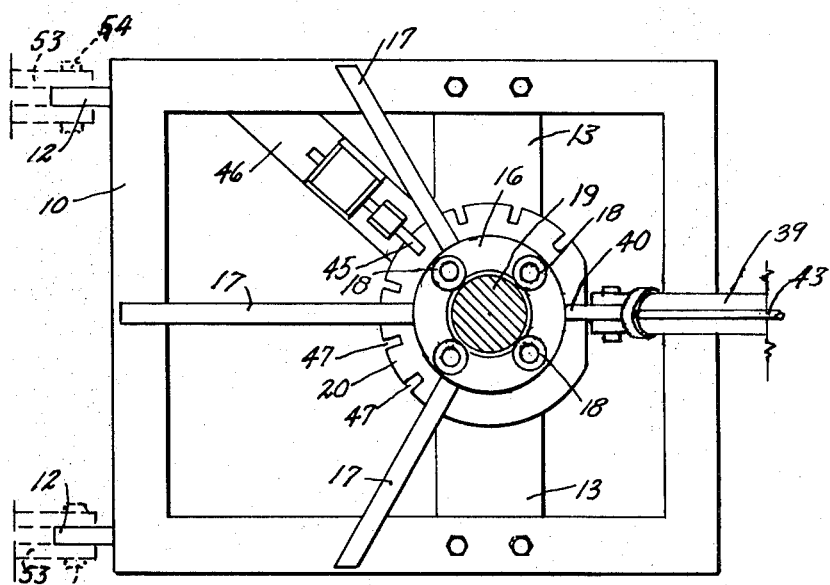
FIG. 3 is a horizontal, fragmentary sectional view looking downwardly on the line 3-3, FIG. 2.

The conveyor assembly can be locked at any desired horizontally radial angle by means of a spring-loaded, solenoid-actuated pawl 45 which is mounted upon a mounting plate 46 on the base frame 10 so as to selectively engage circumferentially spaced locking notches 47 in the periphery of the locking plate 20, as shown in FIG. 3. Convenient manual handles 48 and electrical control boxes 49 are provided on the opposite sides of the free extremities of the sideplates to facilitate placement and operation of the improved stacker. The control boxes 48 are provided with suitable conventional control buttons 50 for starting, stopping and reversing the conveyor motor 35 and for energizing and deenergizing the solenoid-actuated locking pawl 45. It is believed the operation and use of the invention will be clearly apparent, to those skilled in the art, from the above description of the construction thereof.

While a specific form of the invention has been described and illustrated herein, it is to be understood that the same may be varied within the scope of the appended claims, without departing from the spirit of the invention.

Having thus described the invention what I claim and desire to be secured by Letters Patent is:

1. A portable stacking device for receiving and positioning loads delivered by a conveyor comprising:
   a. a base frame adapted to be horizontally and portably supported upon a floor;
   b. a base bearing medially secured upon and projecting upwardly from said base frame;
   c. a horizontal, annular, brace ring rigidly supported from said base frame in vertically spaced concentric relation with said base bearing;
   d. a vertical yoke shaft journaled in said base bearing at its lower extremity and arising axially and rotatably through said brace ring and laterally supported by said ring;
   e. a conveyor-supporting yoke, fixedly mounted on the upper extremity of said yoke shaft and supporting a conveyor assembly thereon;
   f. a horizontal, circular locking plate, provided with circumferentially spaced notches, concentrically secured to said yoke shaft between said base bearing and said brace ring; and
   g. a notch-engaging locking pawl horizontally mounted on said base frame in the plane of said locking plate adapted to selectively engage the spaced notches of the latter to lock said vertical yoke shaft at desired circumferential positions.

2. A portable stacking device as described in claim 1 having:
   a. inclined radially positioned brace members secured to said base frame at their outer extremities and extending axially inward and upward to a fixed connection with said brace ring at their axial extremities to brace and support said brace ring above said locking plate.

3. A portable stacking device as described in claim 2 having:
   a. an annular series of spaced rollers pivoted on said brace ring about and in circumferential contact with the yoke shaft to resist lateral tilting of the latter shaft in the stationary brace ring.

4. A portable stacking device as described in claim 1 having:
   a. a hydraulically expansible brace hingedly mounted at its lower extremity on said locking plate and extending upwardly and outwardly to a hinged connection with said conveyor assembly so as to horizontally rotate as a unit with the locking plate and control vertical movements of said conveyor assembly.